United States Patent [19]

Nix

[11] Patent Number: 5,381,441
[45] Date of Patent: Jan. 10, 1995

[54] DIRECT CURRENT ARC FURNACE AND METHOD FOR ITS OPERATION

[75] Inventor: Edgar Nix, Ratingen, Germany

[73] Assignee: Deutsche Voest-Alpine Industrieanlagenbau GmbH, Dusseldorf, Germany

[21] Appl. No.: 160,694

[22] Filed: Dec. 1, 1993

[30] Foreign Application Priority Data

Dec. 4, 1992 [DE] Germany .................... 4240891

[51] Int. Cl.⁶ .................................... F27D 1/00
[52] U.S. Cl. ............................... 373/72; 373/85; 373/108
[58] Field of Search ............... 373/71, 72, 85, 64, 373/102, 108, 70, 88

[56] References Cited

U.S. PATENT DOCUMENTS

| | | | |
|---|---|---|---|
| 787,059 | 4/1905 | Stoddard | 72/347 |
| 3,949,151 | 4/1976 | Kerton | 373/107 |
| 4,336,411 | 6/1982 | Hanas et al. | 373/108 |
| 4,356,340 | 10/1982 | Stenkvist | 373/107 |
| 4,821,284 | 4/1989 | Janiak et al. | 373/107 |
| 5,138,630 | 8/1992 | Suga | 373/107 |
| 5,191,592 | 3/1993 | Janiak et al. | 373/107 |
| 5,237,585 | 8/1993 | Stenkvist | 373/72 |

Primary Examiner—Bruce A. Reynolds
Assistant Examiner—Tu Hoang
Attorney, Agent, or Firm—Marshall & Melhorn

[57] ABSTRACT

A direct current arc furnace is described with a cathodic electrode held in the center of the melting vessel and an anodic bottom electrode arrangement in the vicinity of an electrically conductive lower vessel from the vessel wall to the melt. The current supply and removal takes place on one side via leads to a rectifier power supply set up in spaced manner alongside the furnace. The lower vessel is connected in several quadrants with leads and in the vicinity of each quadrant a connecting plate is provided on the furnace wall. Close below the arc the power supplies are led in a horizontal plane to the furnace wall. The current intensity for the quadrants of the lower vessel adjacent to the rectifier power supplies is lower than that of the power supplies to the remaining quadrants. The spacings of the connecting plates for the quadrant areas can be unequal.

11 Claims, 3 Drawing Sheets

DIRECT CURRENT ARC FURNACE AND METHOD FOR ITS OPERATION

BACKGROUND OF THE INVENTION

Field of the Invention

The invention relates to a direct current arc furnace and to a method for operating such an arc furnace.

Summary of the Related Art

For the melting of metallic materials in an arc furnace operated with direct current, particularly in the case of powerful furnaces, high current intensities are required and they are the cause of the formation of correspondingly high magnetic fields. With respect to the direct current circuit short-circuited across the arc, such d.c. arc furnaces are characterized by a rectifier arrangement set up laterally alongside the furnace vessel and from which in a horizontal, lower plane one or more anodic current leads pass below the vessel bottom up to its centre, so that the current flow from there takes place via the bottom anode and the melting material in the vessel and the arc to the cathode centrally held in the vessel cover and by means of whose support arm the circuit is closed in the return flow to the rectifier power supply.

This arrangement of the current supply and current tap defines a current loop, which gives rise to a force action directed perpendicularly thereto, which although not influencing the cathodic electrode projecting in perpendicularly displaceable manner into the furnace, but leads to a corresponding deflection of the arc between the cathode and the molten bath. The asymmetry of the arc is the direct cause of increased wear to the refractory lining of the furnace vessel, where the deflected arc comes closer to the vessel wall than intended through its central guidance. With the above-mentioned current conduction said critical area of increased wear to the furnace vessel lining faces that side or is remote from that side from which the current supply and removal of the d.c. arc furnace take place.

To obviate this problem, e.g. in a known arc furnace according to U.S. Pat. No. 4,821,284, a triple conductor loop is close across three arc electrodes, which are arranged centrally round the bottom centre and in the form of an isosceles triangle, said head-side electrodes above the bath surface facing the bottom electrodes in the same configuration. There are horizontal supply and removal bars above and below the furnace area.

A further known d.c. arc furnace (DE 40 35 233 A1) only has a single bottom electrode, which passes in the centre of the bottom up to the melt, said electrode once again facing a vertically displaceable cathode mounted centrally with respect to the furnace. In order to stabilize the arc in the centre of the furnace, four conductors are led to the centrally positioned anode below the furnace vessel from two opposite sides, so that the connections thereof either take place in facing manner or in alternating facing manner.

Finally, in this connection, reference is made to another known d.c. arc furnace (U.S. Pat. No. 787,059), in which the lower part of the furnace vessel is used for current conduction to the anode segments located in the centre of the d.c. furnace.

SUMMARY OF THE INVENTION

Based on this known prior art, the present invention for a direct current arc furnace of the aforementioned type aims at solving the problem of ensuring a uniform refractory wear of the furnace lining by centring the arc in the centre of the hearth even if in the case of one-sided current supply and removal the anodic current leads are led laterally up to the furnace, even under high currents.

The problem of non-uniform refractory wear is solve by the arc furnace apparatus and method of the present invention.

The basis here is not a central current supply to a single bottom electrode, but a current supply which is surface distributed in the bottom area of the bath and connected to current leads laterally led up to the furnace wall. For this purpose there are four quadrants in the lower vessel of the furnace and with each of which is associated a connecting plate laterally on the steel casing of the lower vessel, the quadrants being conductively interconnected via the furnace vessel. Thus, the anode-side current supply takes place via the lower vessel from its lateral outer wall to the vessel bottom and from there via anode plates in the refractory lining to the melt. With such a current supply it has surprisingly proved to be particularly advantageous to so vary the current intensities in the leads to the different quadrants that the magnetic fields caused by shunt currents in the lower vessel part and the forces resulting therefrom it is possible to counteract the forces occurring in the current loops via the supply and removal. Particularly in the case of high currents the deflection produced on the arc otherwise leads to premature wear to the lining in the quadrants remote from the rectifier power supply.

As the extent of the indicated deflection is not only a function of the current intensity flowing through the d.c. circuit, but is essentially also determined by the geometrical construction of the current loop, an important part is played by the height position of the plane in which the leads to the furnace are located and namely with reference to the height of the arc in the furnace centre. A central supply of current from the furnace bottom only shields to a very limited extent the magnetic fields building up round the current conductors, whereas a lateral power supply gives a much greater shielding action. In theory, the influence of the magnetic fields of the leads on the arcs could be minimized by positioning than at the direct height of the arc.

According to the invention an optimization has been found here in that the current supplies are led up to the wall of the lower vessel laterally close below the arc in a horizontal plane, i.e. a central current supply over the vessel bottom is avoided here. For this purpose, the lower vessel advantageously has for each quadrant an individual lead via an associated connecting plate, the quadrants being electrically conductively interconnected via the vessel wall.

It is important for the present invention that by a planned modification of the current intensity in the individual leads additional magnetic fields are produced by shunt currents in the bottom area and which in coordination with the planned shielding of the magnetic fields around the leads by the yoke action of the lateral steel wall of the lower vessel can lead to a controllable correction of the arc deflection.

In certain cases it can also be advantageous to only have two power supplies with two rectifier units or more than four power supplies for more than four quadrants of the lower vessel. It must always be ensured that the design of the rectifier supplying the conductors is in accordance with the set asymmetries.

From the method standpoint the d.c. furnace is always operated in such a way that the currents flowing in the separate power supplies via the lower vessel to the bottom anode are set as a function of the deflection of the arc formed between the cathode and the melt. It is particularly advantageous to determine the deflection of the arc above the melt and to supply the individual leads with correspondingly different currents in accordance with the value found in each case, so that a planned force with the necessary additional magnetic fields can be exerted on the arc throughout the furnace operation.

It can also be advantageous for the invention that the arc can be guided in the furnace centre by modifying the arrangement of the anode plates on the bottom of the lower vessel of the furnace and so as to permit additional optimization.

The invention is described in greater detail hereinafter relative to non-limitative embodiments and with respect to the attached drawings, wherein show:

DESCRIPTION OF THE PREFERRED EMBODIMENT

Figure 1:
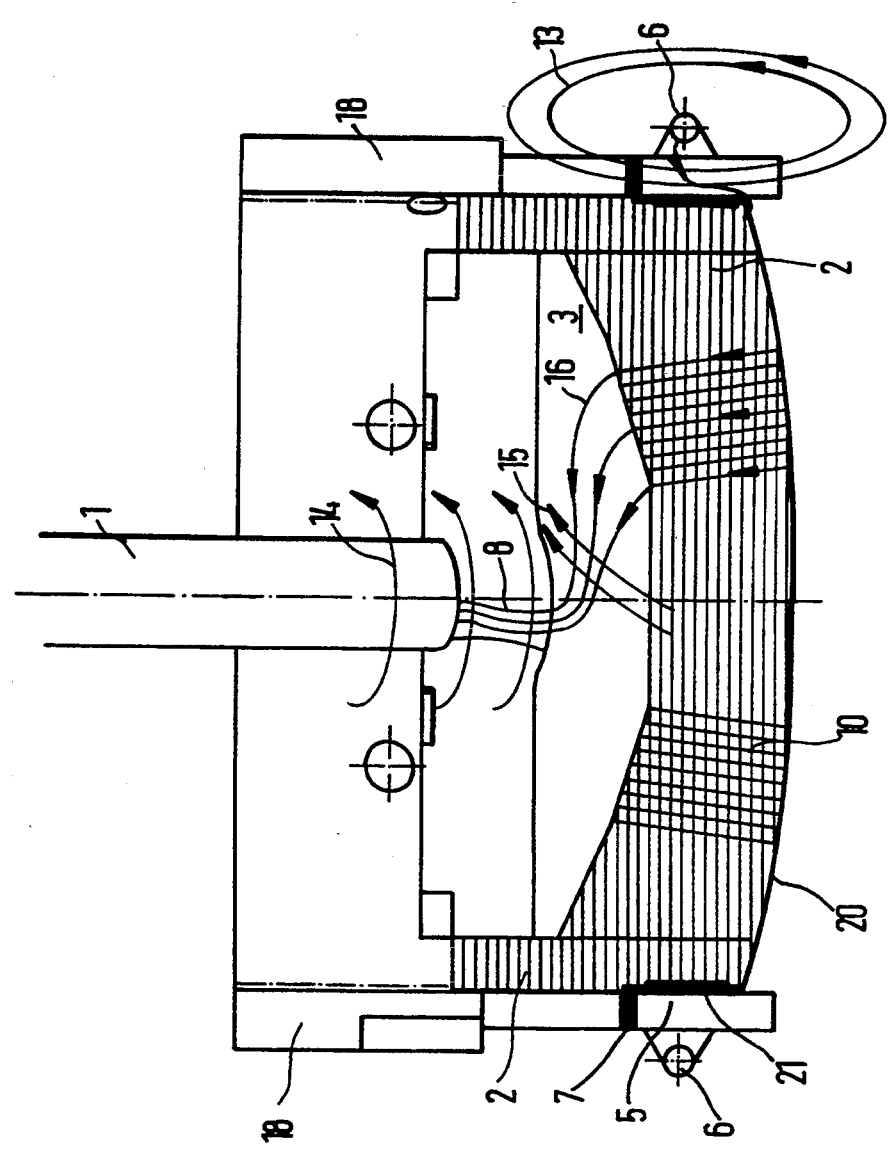
FIG. 1 A cross-section through a direct current arc furnace.

As can be gathered from FIG. 1, the direct current arc furnace comprises a lower vessel 5 and an upper vessel 18 electrically insulated therefrom by the insulation 7. In conventional manner the furnace is lined with a refractory lining 2 and receives the melt 3. Through the cover a graphite electrode projects in vertically displaceable manner into the furnace centre and forms the cathode 1 for the d.c. arc and is held by a not shown electrode support arm 9 ( FIGS. 2 and 3).

The bottom 20 of the lower vessel 5, like its outer wall, is made from sheet steel, which is lined in adequately thermally insulated manner, the current flow through said refractory lining 2 being uniformly distributed in the form of a central ring via the vessel bottom over the melt 3 by means of anode plates 10. The steel vessel forms the outer, conductive metal shell, comprising the vessel bottom 20 and the lateral furnace wall 21 which, as will be described hereinafter, is not only determinative for the anodic current supply, but in particular for the shielding of the magnetic fields 13 building up round the power supplies outside the furnace. The power supply 6 is led in the form of water-cooled tubes around the lower vessel 5 along the lateral furnace wall 21. The arc 8 forms between the surface of the melt 3 and the cathode 1, part of the current flow lines within the melt 3 being indicated by the reference numeral 16 in FIG. 1.

Figure 2:
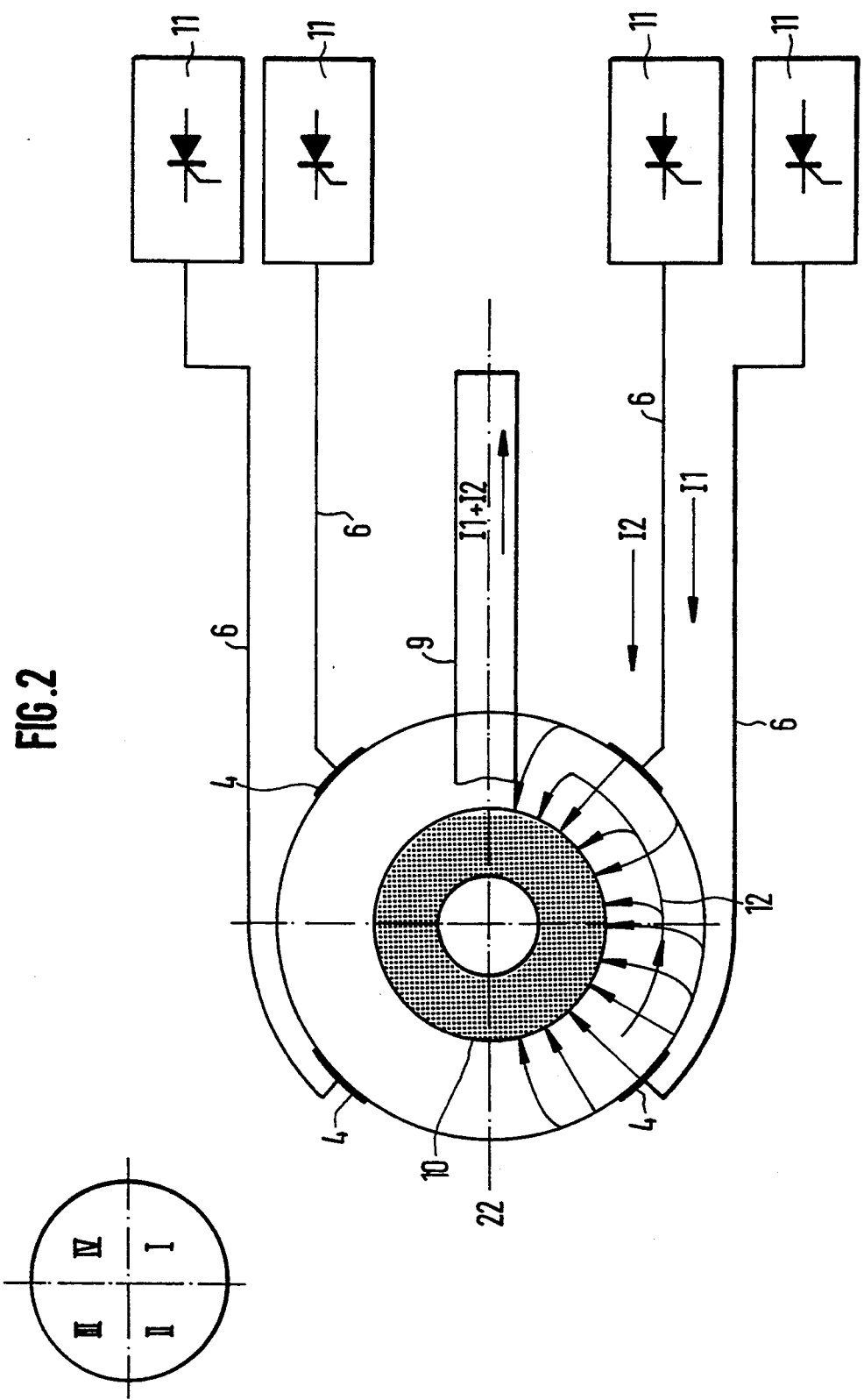
FIG. 2 A diagrammatic plan view of the melting furnace with a rectifier power supply on one side and the lead and tap connections.

As can be gathered in conjunction with FIG. 2, on the furnace wall 21 of the lower vessel 5 in the form of in all four quadrants I to IV there are connecting plates 4 for the four current leads 6, which pass in a horizontal plane below the arc 8 to the rectifier power supplies 11. The electrode support arm 9 holding the cathode 1 is positioned horizontally in a plane located above the furnace and closes the current loop to the rectifier power supplies 11 formed by the leads 6, the connecting plates 4, the vessel walls 21, 20, the anode plates 10, the arc 8 and the cathode 1.

By a different distribution of the current intensities over the four quadrants I to IV, i.e. over the four leads 6, the position and/or deflection of the arc can be influenced. In the case of an identical current distribution, as a result of the force action, the arc is initially deflected perpendicular to the magnetic fields of the current loop in the direction away from the rectifier supplies 11, which leads to the known, increased burn-off of the refractory lining 2, particularly in quadrants II and III in the case of the prior art. On increasing the current intensity in the two leads 6 to the connecting plates 4 in quadrants II and III remote from the d.c. supplies 11, there is an equalizing current indicated by the arrows 12 in FIG. 2 and which makes it possible to correct the aforementioned arc deflection, i.e. it can again be guided centrally to the furnace axis. The cause of these equalizing currents is the increased resistance of the anodic side of the furnace compared with the lower electrical resistance of the leads 6.

The equalizing currents 12 are the reason for the production of additional magnetic fields 15, which are indicated by arrows in FIG. 1 and which exert a force on the arc, which is directed opposite to the deflecting force of the current loop. It is important in this connection that the uniform current loading of in particular the anode plates 10 is not changed as a result of the aforementioned resistance ratio compared with the resistance of the vessel bottom 20 or the wall 21 of the lower vessel 5, which can be kept low together with those of the leads 6.

Figure 3:
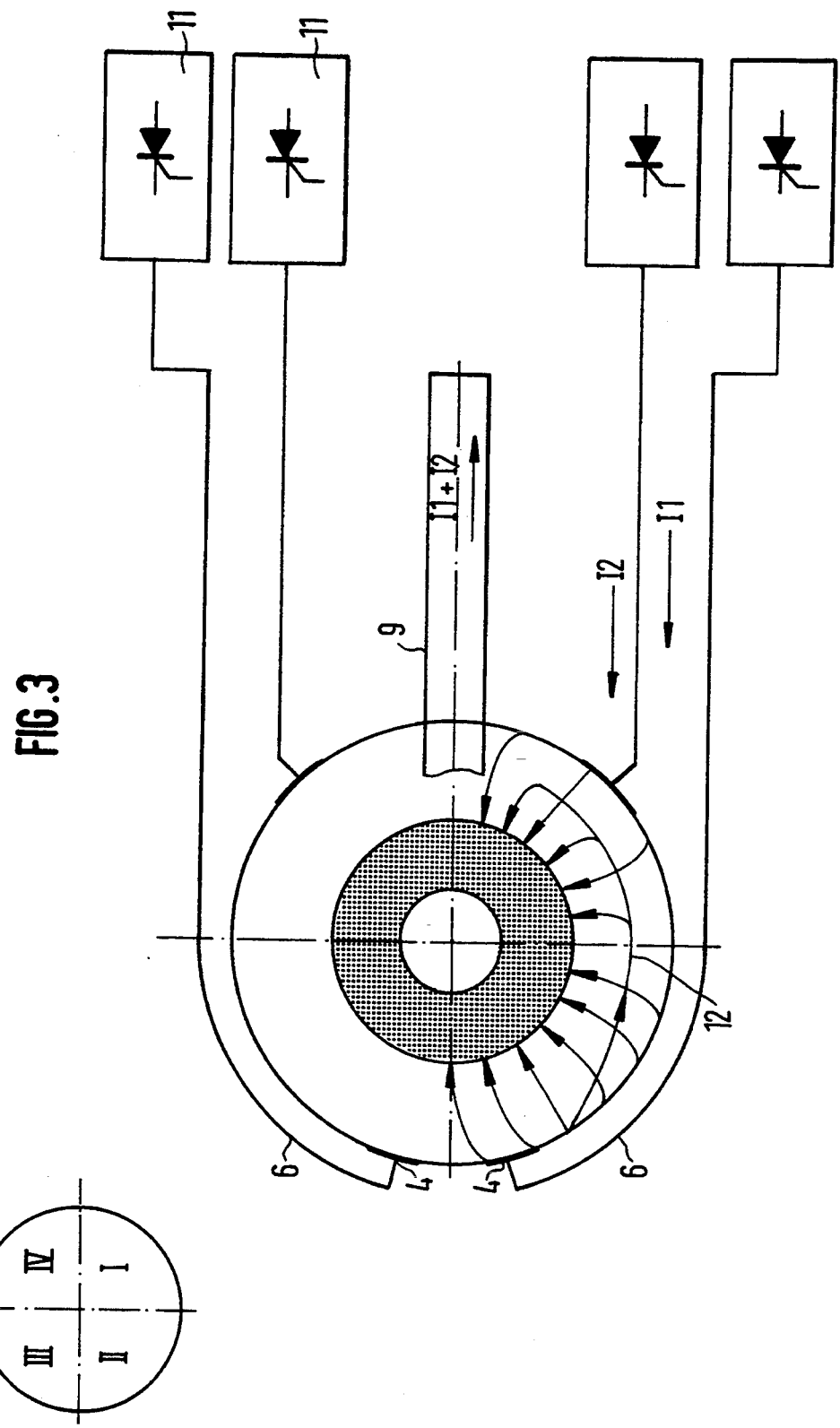
FIG. 3 A representation according to FIG. 2 in a modified embodiment, once again with the quadrants at the top left.

However, the so-called foot circle of the arc 8 cannot only be influenced by giving different current intensities for the four quadrants I to IV via the leads 6, but also via the local association of the connecting plates 4 with the particular quadrants. Such a modified embodiment is shown in FIG. 3, where the geometrical arrangement of the connecting plates 4 is such that with respect to an imaginary, central axis 22 passing through the furnace centre leads the electrode support arm 9 to the rectifier power supply 11, brings the plates 4 of the outer quadrants II, III in position on this axis, unlike in the arrangement according to FIG. 2, in which the connecting plates 4 in the four quadrants in each case diametrically face one another and are consequently reciprocally oriented with an angle of 90°.

The arrangement of the connecting plates can be brought about on setting up the furnace. However, it is also conceivable to modify this during furnace operation, particularly as the outer furnace wall 21 is easily accessible.

The setting of different current intensities via the leads 6 is carried out by means of the set point for the current regulators of the rectifier power supplies 11 and can be continuously modified in accordance with a modified furnace operation, if required. The currents flowing in the separate current leads 6 via the lower vessel 5 to the bottom anode are so set as a function of the deflection of the arc 8 between the cathode 1 and the surface of the melt 3, that the arc is directed centrally to the furnace geometry.

I claim:

1. A direct current arc furnace for melting a raw material by production of electric arcs, said arc furnace provided with a melting vessel having an electrically conductive lower vessel, an upper vessel, and a vessel cover; a refractory lining secured in said melting vessel; a vertically displaceable cathodic electrode positioned in the center of the vessel cover and secured by an electrode support arm, said cathodic electrode extending above the vessel cover and passing through the vessel cover in order to enter the melting vessel; an anodic electrode arrangement formed by anode plates in a bottom of said lower vessel; and a direct current source connected to a plurality of leads to said cathodic electrode and said anodic electrode arrangement to form a current loop for producing a desired arc through said raw material, said arc furnace characterized by the following features:

a) a plurality of connecting plates adjustably secured to the bottom of said lower vessel, each connecting plate defining a conducting area of the anodic electrode arrangement;

b) a plurality of current-regulated power supplies included in said direct current source, each power supply transmitting a current through a lead to a corresponding connecting plate;

c) a positioning means for securing the plurality of leads in a horizontal plane, said positioning means secured to an outer perimeter of said lower vessel; and d) a current regulating means for independently controlling the current transmitted by each of said power supplies to said corresponding connecting plate, whereby the position and deflection of the arc are controlled by controlling the current transmitted by each power supply and by adjusting the position of the connecting plates.

2. Arc furnace according to claim 1, characterized in that said lower vessel includes a steel casing, and in that the leads from the power supplies of said direct current source to the connecting plates are positioned laterally of the steel casing such that the steel casing shields direct current in the current loop from magnetic fields building up around the leads.

3. Arc furnace according to claim 1, characterized in that said direct current source includes at least two rectifier power supplies connected to the connecting plates on the lower vessel.

4. Arc furnace according to claim 1, characterized in that the lower vessel is electrically insulated from the upper vessel and is used for current carrying purposes.

5. Arc furnace according to claim 1, characterized in that each individual current transmitted from said power supplies through each of said leads to the connecting plate is continuously adjustable by adjusting said current regulating means.

6. A direct current arc furnace for melting a raw material by production of electric arcs, said arc furnace provided with a melting vessel having an electrically conductive lower vessel, an upper vessel, and a vessel cover; a refractory lining secured in said melting vessel; a vertically displaceable cathodic electrode positioned in the center of the vessel cover and secured by an electrode support arm, said cathodic electrode extending above the vessel cover and passing through the vessel cover in order to enter the melting vessel; an anodic electrode arrangement formed by a plurality of anode plates in a bottom of said lower vessel; and a direct current source connected to a plurality of leads to said cathodic electrode and said anodic electrode arrangement to form a current loop for producing the desired arc through said raw material, said arc furnace characterized by the following features:

a) said plates including four connecting plates adjustably secured to the bottom of said lower vessel, said four connecting plates positioned to define four symmetrical conducting areas of the anodic electrode arrangement with two conducting areas being proximate to said power source and two conducting areas being distal;

b) four current-regulated power supplies included in said direct current source, each power supply transmitting a current through a lead to a corresponding connecting plate;

c) a positioning means for securing the leads in a horizontal plane, said positioning means secured to an outer perimeter of said lower vessel; and d) a current regulating means for independently controlling the current transmitted by each of said power supplies to said corresponding connecting plate, whereby the position and deflection of the arc are controlled and guided to the center of the arc furnace by controlling the current transmitted from the power supplies such that the current to the proximate conducting areas is less than the current transmitted to the distal conducting areas, and by adjusting the position of the connecting plates.

7. Arc furnace according to claim 6, characterized in that the connecting plates for the distal conducting areas are displaced towards a longitudinal axis extending from said direct current source through a center of the melting vessel.

8. Arc furnace according to claim 6, characterized in that the sum of the currents transmitted by said power supplies through the leads to connecting plates of the proximate conducting areas is smaller than the sum of the currents through the distal conducting areas.

9. Arc furnace according to claim 8, characterized in that each power supply and corresponding lead is dimensioned in such a way that it corresponds to an asymmetry set by said plates.

10. Method for the operation of a direct current arc furnace for melting a raw material by production of electric arcs, said arc furnace provided with a melting vessel having an electrically conductive lower vessel, an upper vessel, and a vessel cover; a refractory lining secured in said melting vessel; a vertically displaceable cathodic electrode positioned in the center of the vessel cover and secured by an electrode support arm, an anodic electrode arrangement formed by anode plates in a bottom of said lower vessel, a plurality of connecting plates adjustably secured to the bottom of said lower vessel, each connecting plate defining a conducting area of the anodic electrode arrangement; and a plurality of current-regulated power supplies connected by leads to said cathodic electrode and the conducting plates of said anodic electrode arrangement for transmitting a current through a lead to a corresponding connecting plate source, said method for operation of a direct current arc furnace characterized by the following steps:

a) monitoring a current transmitted in each of the leads from the power supplies to the corresponding conducting plates;

b) monitoring a deflection of the arc formed between the cathodic electrode and the raw material; and c) controlling and adjusting the current transmitted in each of the leads to said plates to minimize the deflection of the arc to the refractory lining.

11. The method of operation of an arc furnace according to claim 10 including the additional step of positioning the connecting plates on the lower vessel after monitoring the deflection of the arc and before adjusting the current in the leads.

* * * * *